United States Patent
Seo

(10) Patent No.: US 8,670,765 B2
(45) Date of Patent: Mar. 11, 2014

(54) MOBILE TERMINAL AND HANDOVER METHOD THEREOF

(75) Inventor: Gwan Gyu Seo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 109 days.

(21) Appl. No.: 13/332,759

(22) Filed: Dec. 21, 2011

(65) Prior Publication Data

US 2012/0165016 A1    Jun. 28, 2012

(30) Foreign Application Priority Data

Dec. 24, 2010    (KR) .................. 10-2010-0134766

(51) Int. Cl.
*H04W 36/00*    (2009.01)
(52) U.S. Cl.
USPC ........... 455/439; 455/466; 455/424; 455/436; 370/331
(58) Field of Classification Search
USPC ........ 455/436–442, 67.11, 425, 466; 370/331
See application file for complete search history.

(56) References Cited

U.S. PATENT DOCUMENTS

| | | | | |
|---|---|---|---|---|
| 5,146,609 A | * | 9/1992 | Tayloe et al. | 455/436 |
| 5,239,682 A | * | 8/1993 | Strawcynski et al. | 455/436 |
| 5,784,695 A | * | 7/1998 | Upton et al. | 455/442 |
| 7,251,490 B2 | * | 7/2007 | Rimoni | 455/436 |
| 8,233,902 B2 | * | 7/2012 | Kim et al. | 455/436 |
| 8,238,899 B2 | * | 8/2012 | Salomone et al. | 455/424 |
| 8,526,980 B2 | * | 9/2013 | Ebata | 455/466 |
| 2002/0090947 A1 | * | 7/2002 | Brooks et al. | 455/436 |
| 2007/0167165 A1 | * | 7/2007 | Yang et al. | 455/439 |
| 2010/0074227 A1 | * | 3/2010 | Boncz et al. | 370/331 |
| 2011/0058529 A1 | * | 3/2011 | Uemura | 370/331 |
| 2011/0164589 A1 | * | 7/2011 | Lee et al. | 370/331 |

* cited by examiner

Primary Examiner — Sharad Rampuria
(74) Attorney, Agent, or Firm — Jefferson IP Law, LLP

(57) ABSTRACT

A mobile terminal and a method to transmit a handover complete message in a handover process are provided. The handover method of the present invention includes determining, when a handover command message is received, a handover complete message transmission period, transmitting, when channel establishment information is received, a handover complete message during the handover complete message transmission period, and completing, when a handover complete message transmission period expires, handover to communicate with a base station to which the mobile terminal is handed over. The mobile terminal and handover method thereof are capable of transmitting the handover complete message repeatedly during a predetermined period, resulting in reduction of a probability of a handover failure.

12 Claims, 4 Drawing Sheets

PRIOR ART

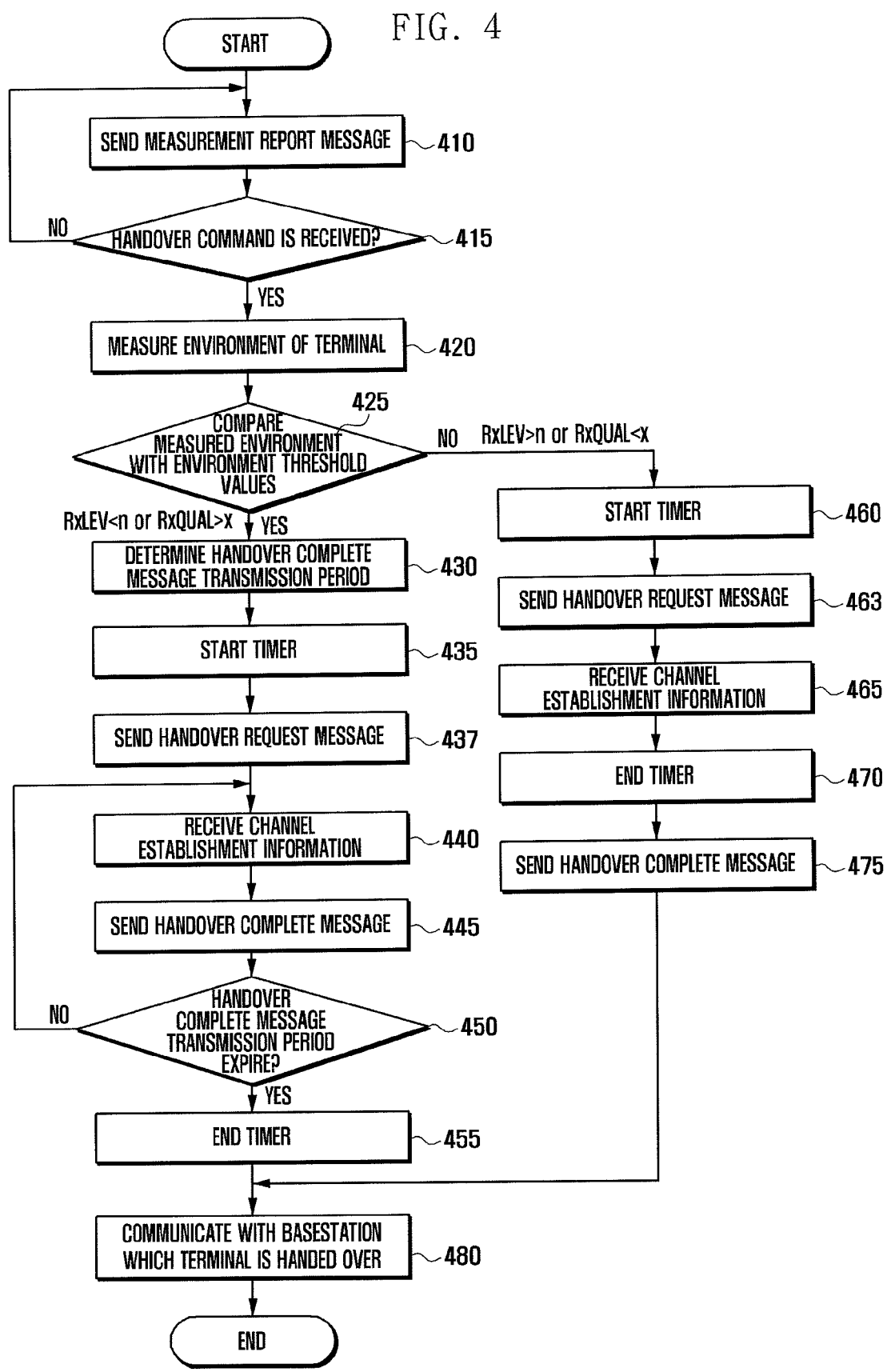

MOBILE TERMINAL AND HANDOVER METHOD THEREOF

PRIORITY

This application claims the benefit under 35 U.S.C. §119 (a) of a Korean patent application filed on Dec. 24, 2010 in the Korean Intellectual Property Office and assigned Serial No. 10-2010-0134766, the entire disclosure of which is hereby incorporated by reference.

BACKGROUND OF THE INVENTION

1. Field of the Invention

The present invention relates to a mobile terminal and handover method thereof. More particularly, the present invention relates to a mobile terminal performing a $2^{nd}$ Generation (2G) communication function and a method for the terminal to transmit a handover complete message in a handover process.

2. Description of the Related Art

FIG. 1 is a signaling diagram illustrating operations of a mobile terminal and a base station when performing a handover procedure according to the related art. In more detail, FIG. 1 is a drawing illustrating a handover procedure of the related art between the terminal and base station in a mobile communication system.

Referring to FIG. 1, the mobile communication system includes a terminal 110 and a base station 120.

The terminal 110 sends a measurement report message to the base station 120 in step 130. The measurement report message includes identity information and channel condition information of the serving cell and neighbor cells around the terminal 110. Upon receipt of the measurement report message, the base station 120 analyzes the measurement report message to determine whether to perform handover. If the decision to handover is made, the base station 120 sends a handover command message to the terminal 110 in step 135.

The terminal 110 starts a timer in step 140 to check the retransmission period of a handover request message according to whether the channel establishment information used for the handover process is received. Next, the terminal 110 transmits the handover request message to the base station 120 in step 145. Upon receipt of the handover request message, the base station 120 sends the channel establishment information to the terminal 120 in step 150. The channel establishment information includes the identity information of the base station which is used for the handover process. Next, the terminal 110 performs handover using the received channel establishment information. Finally, the terminal 110 ends the timer in step 160 and then transmits a handover complete message to the base station in step 170.

Typically, since the handover takes place under a weak electric field condition, there is a probability that the handover will fail. Thus, there can be a situation in which the base station does not receive the handover complete message transmitted by the terminal after successful handover. However, the terminal does not know whether the handover complete message is received by the base station. In this case, the mobile terminal is likely to interpret the situation as a handover failure and, as a consequence, the ongoing communication session of the mobile terminal is broken.

SUMMARY OF THE INVENTION

Aspects of the present invention are to address at least the above-mentioned problem and/or disadvantages and to provide at least the advantages described below. Accordingly, an aspect of the present invention is to provide a mobile terminal and a method for performing handover in adaptation to the operation environment of the terminal.

In accordance with an aspect of the present invention, a handover method of a mobile terminal is provided. The terminal includes determining, when a handover command message is received, a handover complete message transmission period, transmitting, when channel establishment information is received, a handover complete message during the handover complete message transmission period, and completing, when a handover complete message transmission period expires, handover to communicate with a base station to which the mobile terminal is handed over.

In accordance with another aspect of the present invention, a mobile terminal is provided. The mobile terminal includes a communication unit for receiving a handover command message from a base station, and for transmitting a handover complete message to the base station, and a control unit for determining, when a handover command message is received, a handover complete message transmission period, for controlling the communication unit to transmit, when channel establishment information is received, the handover complete message during the handover complete message transmission period, and for completing when a handover complete message transmission period expires, handover to communicate with a base station to which the mobile terminal is handed over.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 4 is a flowchart illustrating a handover procedure of a mobile terminal according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the term 'terminal' denotes a data processing device, such as mobile terminal and a Smartphone, having a function of communication with another terminal via a base station.

In the following description, the term 'base station' denotes a device supporting communication network access of the terminal. The base station can be a serving base station or a target base station in the handover process. The serving base station is the base station managing a cell on which the terminal has camped. The target base station is the base station to which the mobile terminal is handed over.

Figure 1:
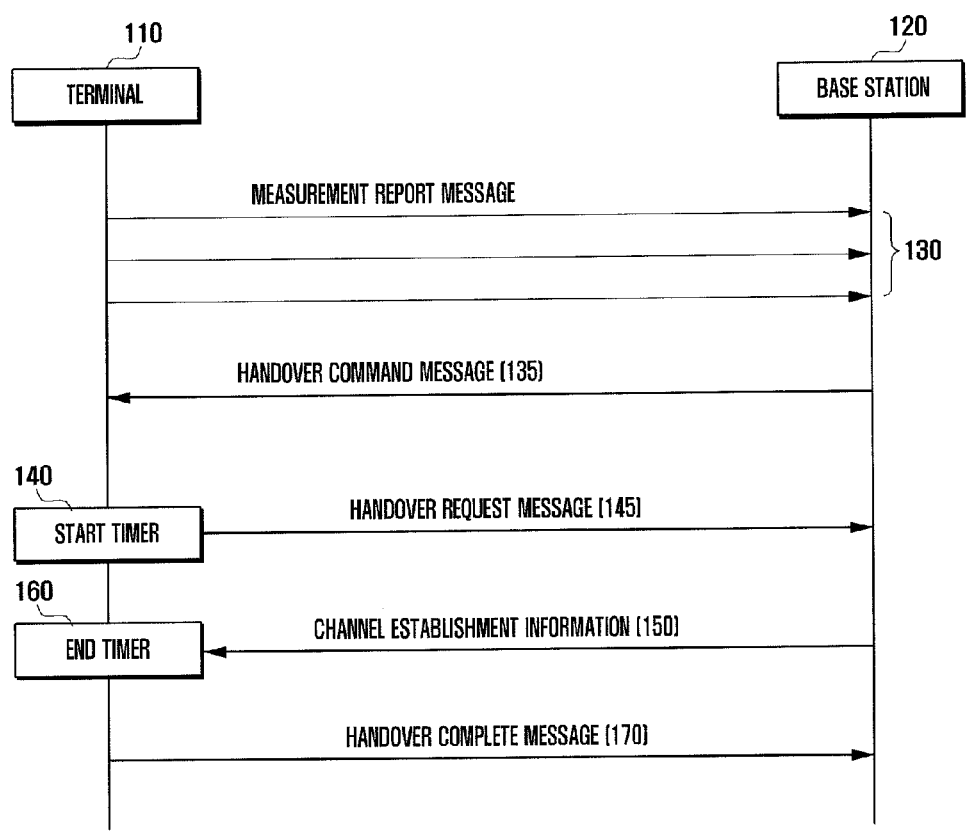
FIG. 1 is a signaling diagram illustrating operations of a mobile terminal and a base station when performing a handover procedure according to an exemplary embodiment of the present invention.
Figure 2:
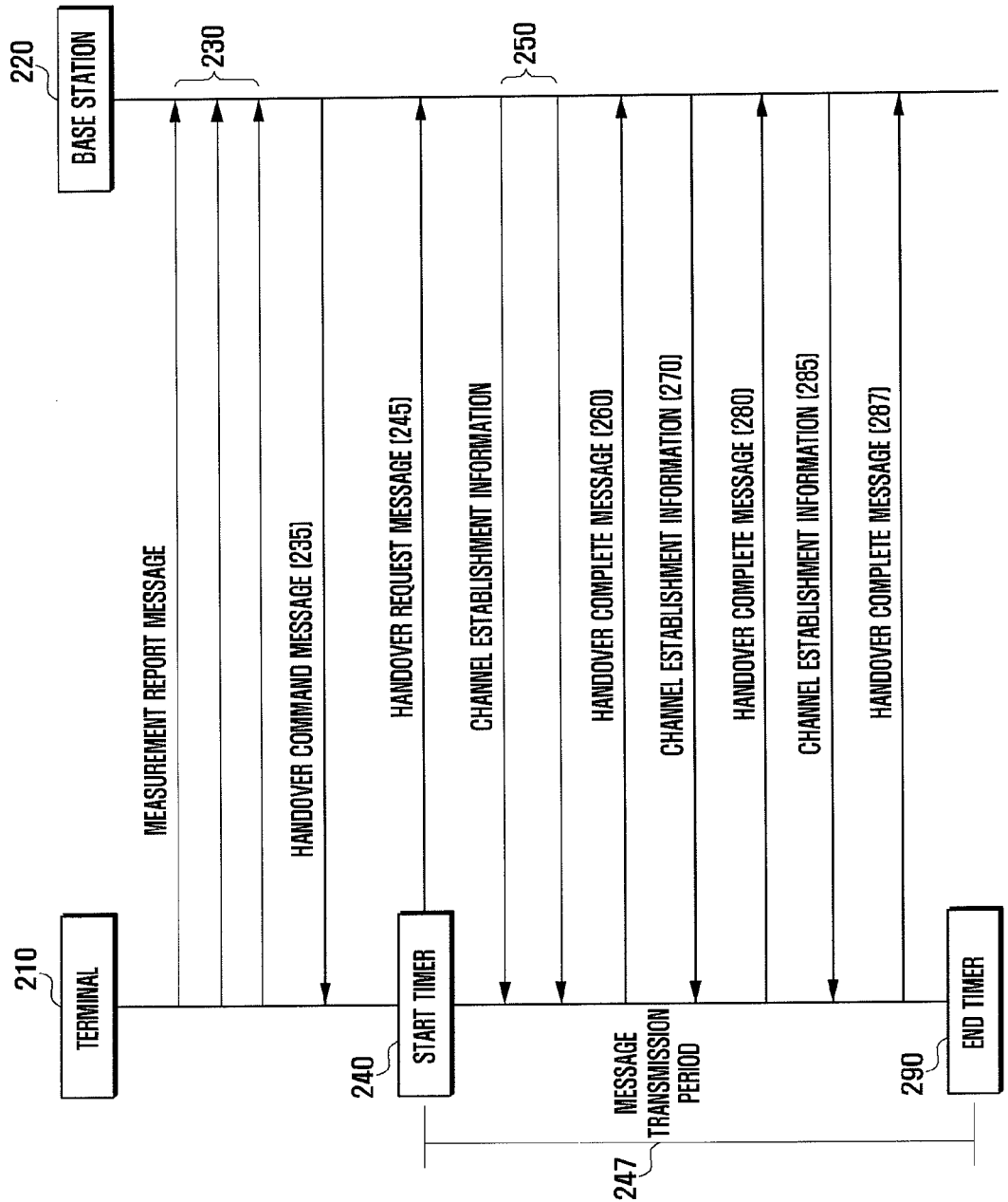
FIG. 2 is a signaling diagram illustrating a handover procedure in a mobile communication system according to an exemplary embodiment of the present invention.

FIG. 2 is a signaling diagram illustrating a handover method in a mobile communication system according to an exemplary embodiment of the present invention.

Referring to FIG. 2, the mobile communication system includes a terminal 210 and a base station 220.

The terminal 210 sends a measurement report message to the base station 220 in step 230. Here, the measurement report message includes identity information of at least one neighbor cell and the serving cell on which the terminal 210 has camped. The measurement report message also includes the information on the signal strengths between the at least one neighbor cell and serving cell and the terminal 210.

The base station 220 makes a decision on whether the mobile terminal should handover based on the information contained in the measurement report message. Once the decision to handover is made, the base station 220 sends a handover command message to the terminal 210 in step 235. The handover command message includes the detailed information on the handover target base station.

If the handover command message is received, the terminal 210 starts a timer in step 240 for determining a transmission period of the handover complete message. Also, the terminal 210 sends a handover request message to the base station 220 in step 245. The handover request message includes the information related to the terminal 210. The terminal 210 also calculates the handover message transmission period 247 for transmitting the received signal level (RXLEV) and received quality (RXQUAL) as the reception conditions of the terminal to the base station 220.

Upon receipt of the handover request message, the base station 220 sends the channel establishment information to the terminal 210 in step 250. The channel establishment information is the information necessary for the handover of the terminal and includes the identity information of the target base station and information necessary for establishing communication channel. If the channel establishment information is received, the terminal 210 sends a handover complete message to the base station 220 in step 260.

The base station 220 retransmits the channel establishment information to the terminal 210 in step 270. Upon receipt of the channel establishment information, the terminal 210 retransmits the handover complete message in step 280. The base station 220 retransmits the channel establishment information to the terminal 210 in step 285. The terminal 210 retransmits the handover complete message to the base station 220 in step 287. The channel establishment information transmission and the handover complete message transmission are repeated in the handover complete message transmission period, which ends when the timer ends in step 290.

Figure 3:
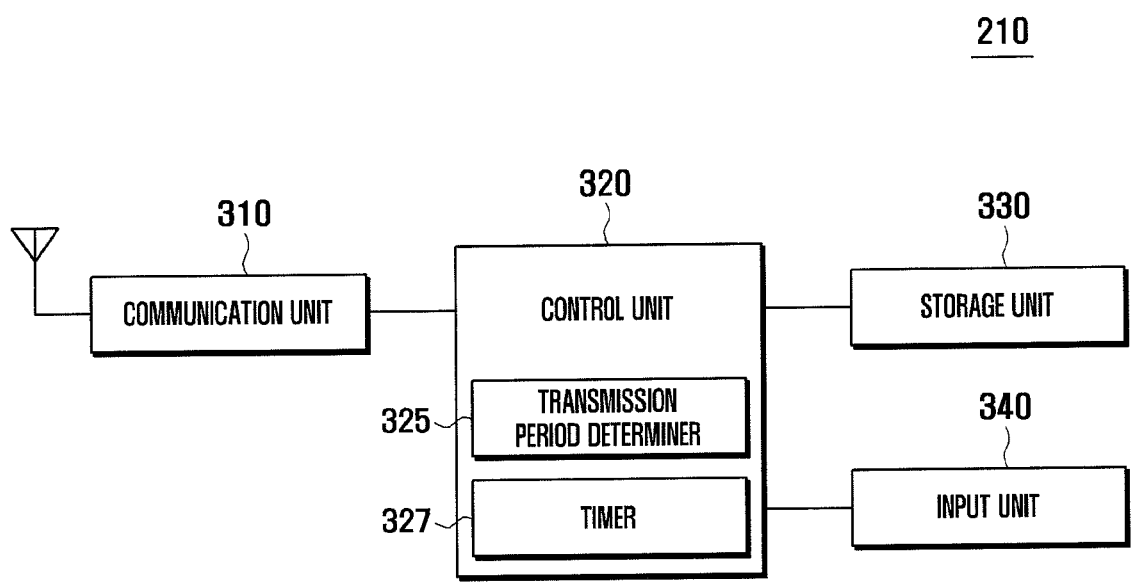
FIG. 3 is a block diagram illustrating a configuration of a terminal according to an exemplary embodiment of the present invention.

FIG. 3 is a block diagram illustrating a configuration of a terminal according to an exemplary embodiment of the present invention.

Referring to FIG. 3, the terminal 210 includes a communication unit 310, a control unit 320, a storage unit 330, and an input unit 340.

The communication unit 310 is responsible for communication of the terminal 210 with the base station. That is, the communication unit 310 establishes a communication channel with the based station for voice and data communications including voice and video calls and text messaging and video transmission services. The communication unit 310 can include a Radio Frequency (RF) transmitter for up-converting and amplifying transmission signals and an RF receiver for low noise amplifying and down-converting reception signals. The communication unit 310 is capable of transmitting and receiving signals carrying certain messages to and from the base station under the control of the control unit 320.

The control unit 320 controls overall operations of internal function blocks of the terminal 210. The control unit 320 controls the communication unit 310 to transmit the measurement report message to the base station 220. The control unit 320 can perform handover when the handover command message is received from the base station 220 by means of the communication unit 310. The control unit 320 can include the transmission period determiner 325 and a timer 327.

The transmission period determiner 325 measures the environment of the terminal 210. Here, the environment of the terminal 210 means the condition of the signal received through the channel established between the terminal 210 and the base station 220. In other words, the environment of the terminal 210 denotes the received signal level (RxLEV) and the received signal quality (RxQUAL).

The transmission period determiner 325 compares the measured environment with a predetermined environment threshold value. If the RxLEV as the measured environment is less than an environment threshold value n or the RxQUAL is greater than an environment threshold value x, the transmission period determiner 325 determines the handover complete message transmission period. The transmission period determiner 325 also can determine a number of transmission times of the handover complete message. At this time, the transmission period determiner 325 can determine the handover complete message transmission period and the number of transmission times of the handover complete message by referencing a transmission period and time table stored in the storage unit 330.

The timer 327 is used for counting the handover complete message transmission period determined by the transmission period determiner 325. The timer 327 can be used for counting the period for transmitting the handover request message in a good channel environment between the base station and the terminal 210 or the channel establishment information is not received.

The control unit 320 starts the timer 327 to count the handover complete message transmission period determined by the transmission period determiner 325. The control unit 320 controls the communication unit 310 to transmit the handover request message to the base station 220. The control unit 320 also controls the communication unit 310 to transmit the handover complete message to the base station 220 repeatedly during the handover complete message transmission period determined by the transmission period determiner 235.

The control unit 320 determines whether the handover complete message transmission period has expired. If the handover complete message transmission period has expired, the control unit 320 ends the operation of the timer 327. The control unit 320 also controls the handover of the terminal to the target base station. The control unit 320 controls the communication unit 310 to communicate with the base station to which the terminal 210 is handed over.

The storage unit 330 stores the data generated according to the operations and state of the terminal 210 under the control of the control unit 320. The storage unit 330 can store the table used for determining the handover complete message transmission period. That is, the storage unit 330 can store the handover complete message transmission period and the number of retransmissions of the handover complete message determined according to the communication environment in the form of a table. The transmission period and number of transmission times of the handover complete message can be determined based on the values obtained as simulation results in various communication environments.

The input unit 340 generates input signals to the control unit 320 in response to the user manipulation. The input unit 340 can generate a signal for making a voice call or a video call to the control unit 320.

The above-structured terminal 210 determines the handover complete message transmission period according to the environment of the terminal 210 and transmits the handover complete message repeatedly during the handover complete message transmission period. By transmitting the handover complete message repeatedly during a predetermined period, it is possible to reduce the handover failure probability.

FIG. 4 is a flowchart illustrating a handover method of a mobile terminal according to an exemplary embodiment of the present invention.

Referring to FIG. 4, the control unit 320 controls the communication unit 310 to transmits the measurement report message to the base station 220 in step 410. Afterward, the control unit 320 determines if a handover command message is received from the base station 220 through the communication unit 310 in step 415. If the handover command message is not received, the control unit 320 returns the process to step 410. Otherwise, if the handover command message is received, the control unit 320 measures the environment of the terminal 210 in step 420. Here, the environment of the terminal 210 includes the received signal level (RxLEV) and the received signal quality (RxQUAL).

After measuring the environment of the terminal 210, the control unit 320 compares the measured environment with predetermined environment threshold values in step 425. If the measured RxLEV is less than the threshold value n or if the measured RxQUAL is greater than the threshold value x, the control unit 320 determines the handover complete message transmission period in step 430. The control unit 320 also can determine the number of times the handover complete message will be transmitted during the handover complete message transmission period. Here, n and x are certain integers indicating conditions for use in making a handover decision at the base station or are configured by a base station manager. For example, if the RxLEV is less than threshold value n set to 10 or if the RxQUAL is greater than the threshold value x set to 4, the control unit 320 can set the handover complete message transmission period to 100 ms. The control unit 320 also can set the number of times the handover complete message is transmitted to 5.

The control unit 320 starts the timer 327 to determine the handover complete message transmission period in step 435. Next, the control unit 320 sends a handover request message to the base station 220 in step 437. Afterward, the channel establishment information is received from the base station 220 in step 440 and, if the channel establishment information is received, the control unit 320 controls the communication unit 310 to send the handover complete message to the base station 220 in step 445.

The control unit 320 determines whether the handover complete message transmission period has expired in step 450. If the handover complete message transmission period has not expired yet, the control unit 320 returns the process to step 440. Otherwise, if the handover complete message transmission period has expired, the control unit 320 ends the operation of the timer in step 455 and communicates with the base station to which the terminal 210 is handed over in step 480.

Returning to step 425, if the measured RxLEV is greater than the threshold value n or the RxQUAL is less than the threshold value x, the control unit 320 starts the timer 327 in step 460 to determine the handover request message transmission period for the case where the channel establishment information is not received. Next, the control unit 320 controls the communication unit 310 to send the handover request message in step 463.

Afterward, the channel establishment information is received in step 465 and, if the channel establishment information is received, the control unit ends the timer 327 in step 470. Next, the control unit 320 controls the communication unit 310 to send the handover complete message to the base station 220 in step 475. Finally, the control unit 320 completes the handover and controls the communication unit 310 to communicate with the base station to which the terminal is handed over in step 480.

Since the handover complete message is transmitted repeatedly during the handover complete message transmission period determined in adaptation to the communication environment, it is possible to reduce the handover failure probability especially when the communication environment between the terminal 210 and the base station 220 is bad.

As described above, the terminal and handover method thereof according to exemplary embodiments of the present invention are advantageous to increase the handover success probability of a mobile terminal in a $2^{nd}$ Generation (2G) communication network, resulting in improvement of voice communication stability.

Also, the terminal and handover method thereof according to exemplary embodiments of the present invention are capable of transmitting the handover complete message repeatedly during a predetermined period, resulting in a reduction in the probability of a handover failure.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A handover method of a mobile terminal, the method comprising:
    determining, when a handover command message is received, a handover complete message transmission period by measuring an environment of the mobile terminal, and
    determining the handover complete message transmission period according to environment measurements of the mobile terminal, wherein the determining of the handover complete message transmission period comprises comparing the measured environment of the mobile terminal with predetermined environment threshold values;
    transmitting, when channel establishment information is received, a handover complete message during the handover complete message transmission period; and
    completing, when a handover complete message transmission period expires, handover to communicate with a base station to which the mobile terminal is handed over.

2. The method of claim 1, wherein the determining of the handover complete message transmission period comprises:
    starting a timer for counting the handover complete message transmission period; and
    transmitting a handover request message to the base station.

3. The method of claim 2, wherein the determining of the handover complete message transmission period further comprises receiving the channel establishment information from the base station.

4. The method of claim 1, wherein the environment of the mobile terminal comprises at least one of a received signal level and a received signal quality.

5. The method of claim 1, further comprising transmitting, prior to receiving the handover command message, a measurement report message.

6. The method of claim 5, wherein the measurement report message comprises at least one of identity information of at least one neighbor cell and a serving cell on which the mobile terminal has camped, and information on signal strengths between the at least one neighbor cell and serving cell and the mobile terminal.

7. A mobile terminal comprising:
    a communication unit for receiving a handover command message from a base station, and for transmitting a handover complete message to the base station; and
    a control unit for determining, when a handover command message is received, a handover complete message transmission period by measuring an environment of the mobile terminal, and
    determining the handover complete message transmission period according to environment measurements of the mobile terminal, wherein the control unit compares the measured environment of the mobile terminal with predetermined environment threshold values, for controlling the communication unit to transmit, when channel establishment information is received, the handover complete message during the handover complete message transmission period, and
    for completing when a handover complete message transmission period expires, handover to communicate with a base station to which the mobile terminal is handed over.

8. The mobile terminal of claim 7, wherein the control unit starts a timer for counting the handover complete message transmission period and controls the communication unit to transmit a handover request message to the base station.

9. The mobile terminal of claim 8, wherein the communication unit receives the channel establishment information from the base station.

10. The mobile terminal of claim 7, wherein the environment of the mobile terminal comprises at least one of a received signal level and a received signal quality.

11. The mobile terminal of claim 7, wherein the control unit controls the communication unit to transmit, prior to receiving the handover command message, a measurement report message.

12. The mobile terminal of claim 11, wherein the measurement report message comprises at least one of identity information of at least one neighbor cell and a serving cell on which the mobile terminal has camped, and information on signal strengths between the at least one neighbor cell and serving cell and the mobile terminal.

* * * * *